July 19, 1949.  F. G. NAGODA  2,476,428
ELECTRIC LEVEL AND PLUMB INSTRUMENT
Filed Sept. 22, 1947  2 Sheets-Sheet 1
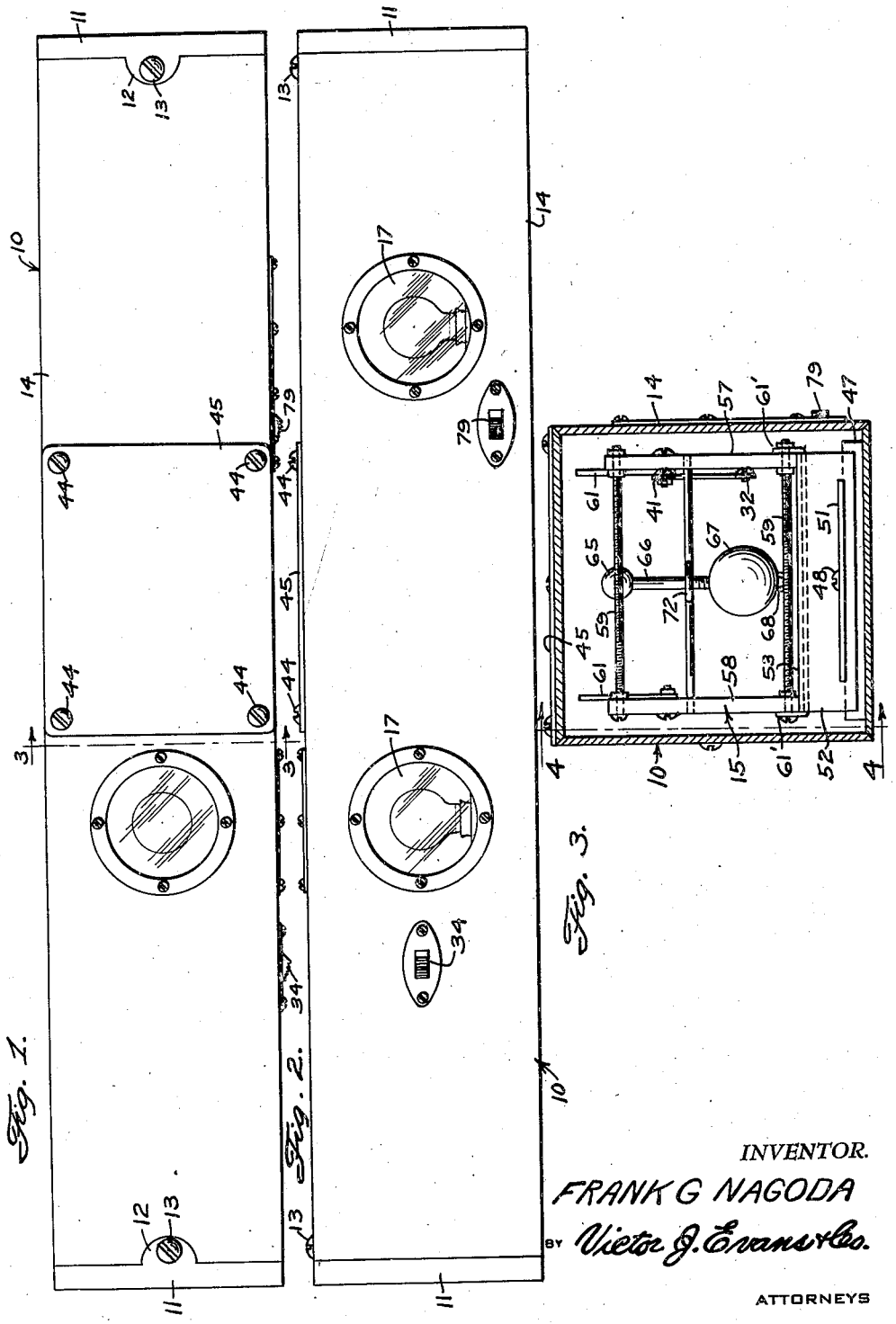
INVENTOR.
FRANK G NAGODA
BY Victor J. Evans & Co.
ATTORNEYS July 19, 1949. F. G. NAGODA 2,476,428
ELECTRIC LEVEL AND PLUMB INSTRUMENT
Filed Sept. 22, 1947 2 Sheets-Sheet 2
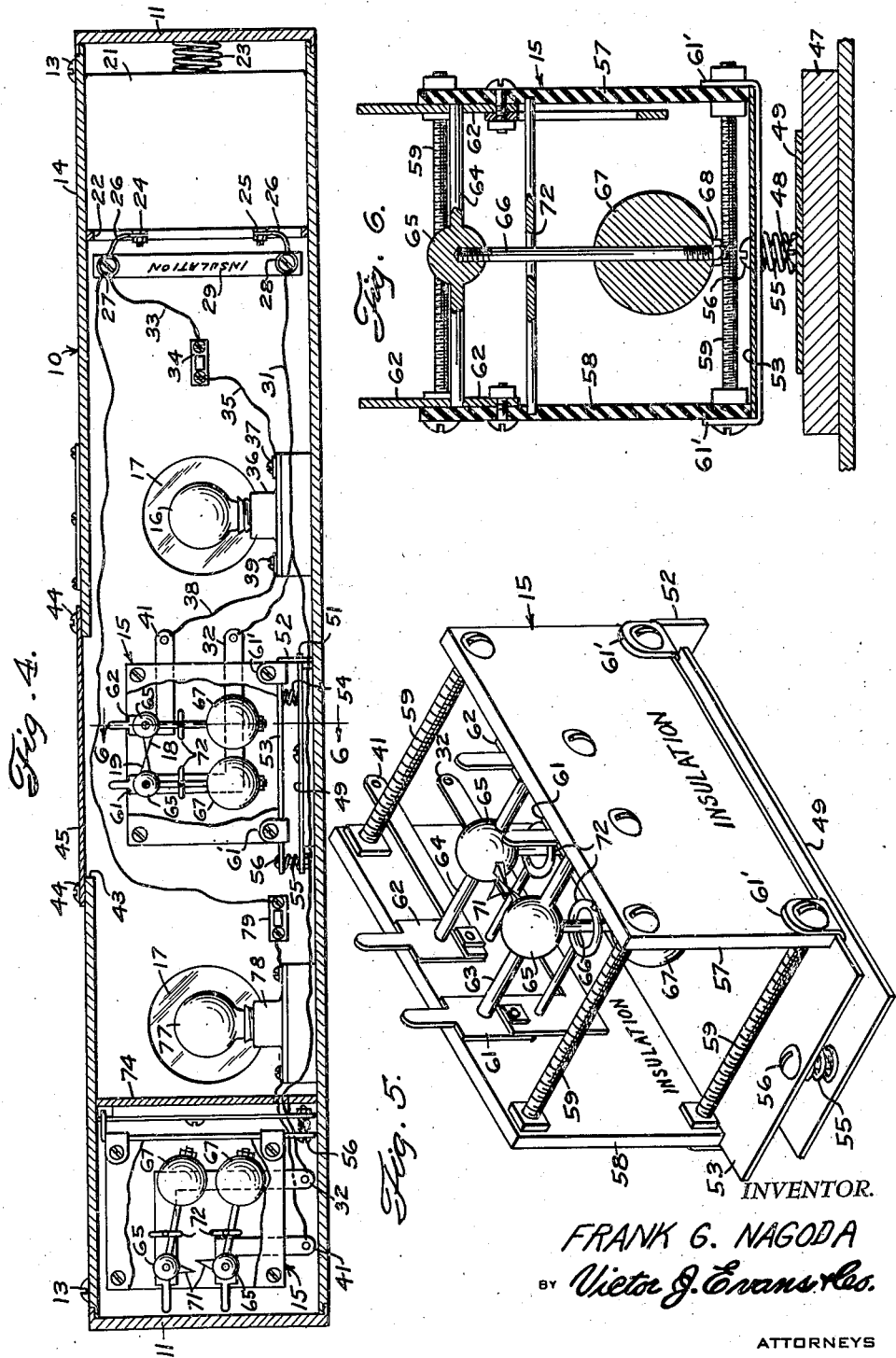
INVENTOR.
FRANK G. NAGODA
BY Victor J. Evans & Co.
ATTORNEYS Patented July 19, 1949

2,476,428

UNITED STATES PATENT OFFICE 2,476,428

ELECTRIC LEVEL AND PLUMB INSTRUMENT

Frank G. Nagoda, Export, Pa., assignor to Mary Nagoda, Export, Pa.

Application September 22, 1947, Serial No. 775,392

3 Claims. (Cl. 33—215).

This invention relates to a carpenter's level and plumb.

It is an object of the present invention to provide an electrically operated carpenter's level and plumb whereby when the work is true an electric lamp will be lighted to give indication.

Other objects of the present invention are to provide an electric level and plumb which has a sensitive contact making device and which is of simple construction, inexpensive to manufacture, easy to assemble and efficient in operation.

For a better understanding of the invention, reference may be had to the following detailed description taken in connection with the accompanying drawing, in which Figure 1 is a top plan view of the level;

Figure 2 is a side elevational view of the level;

Figure 3 is a transverse cross-sectional view taken through the contact making device and on line 3—3 of Figure 1;

Figure 4 is a longitudinal cross-sectional view taken through the level and plumb and on line 4—4 of Figure 3;

Figure 5 is an enlarged perspective view of the contact making device such as used both for indicating a level and at one end for indicating the vertical plumb;

Figure 6 is an enlarged fragmentary and transverse cross-sectoinal view taken through the contact making device and on line 6—6 of Figure 4.

Referring now to the figures, 10 represents the external casing of the level and plumb and which comprises end plates or covers 11 having projections 12 through which are extended screws 13 to fix the covers to ends of hollow member 14 of square section. Within the hollow member 14 and intermediate its length, there is arranged a contact making level device 15 to which is connected a lamp 16 adapted to make indication through a window 17 when contact points 18 and 19 are brought together. In one end of the member 14 is a battery 21 which is pressed against an inwardly extending shoulder 22 within the member 14 by one or more springs 23, which may be a coil spring, as shown, or any other form of spring that will accomplish the purpose for which it is designed. This battery has terminals 24 and 25 which are connected by wires 26 to a binding post 27 and 28 upon a plate 29 fixed to the inner wall face of the member 14. A wire 31 extends from the binding post 28 to a terminal plate 32 of the level device 15. Another wire 33 connects with a button switch 34 from which leads wire 35 for connection with lamp base 36 at 37. A wire 38 leads from a terminal 39 on the lamp base 36 to a contact plate 41 of the device 15. In the top of the hollow casing member 14 is an opening 43 over which there is secured by screws 44 a cover plate 45.

The contact making device 15 comprises a base 47 to which is fixed by a screw 48, a plate 49 having a projection 51, on which is pivoted a downwardly turned end 52 of a supporting plate 53, which is normally retained in a raised position by springs 54 and 55, and these springs, as springs 23, may be coil springs, as shown, or any other type of spring that will accomplish the same purpose. To properly set the device 15, a bolt 56 is adjusted to compress or release spring 55. Extending upwardly from the sides of the plate 53 are side plates 57 and 58 which are held in spaced relationship by spacer bolts 59 disposed at the top and bottom of the same. Stops 61 are extended across the bottom of plate 53 and bent upwardly to receive the bottom spacer bolts 59.

Between the plates 57 and 58, there are supported on plates 61 and 62, pivot shafts 63 and 64 respectively. These pivot shafts have respectively ball sleeves 65, into which there is threaded a shaft 66, to depend downwardly for supporting weights 67 retained on the shaft 66 by a nut 68. The shafts and weights 67 are free to swing in a pendulum-like manner. Extending from each ball 65, is a contact point 71 which will engage to close the lamp circuit to indicate that the work is level. In order to retain the weights 67 within limits, there is provided for each depending shaft 66, a ring stop 72, which is extended between and connected to the plates 57 and 58. Accordingly, when the level is placed on the work, an indication will be made by means of the lamp 16 whether the work is level.

In order that the instrument may be used to indicate whether a vertical member is plumb, another unit or device 15 formed of parts as just described, is provided in the end of the casing member 14 opposite from the battery 21. A partition 74 is provided for supporting the unit 15. This unit can be adjusted by its adjusting screw 56 to be properly set to give a plumb indication. A lamp 77 is mounted on a base 78 and is connected by wires with the device 15, a switch 79 and, through binding posts 27 and 28, to terminals 24 and 25 of battery 21.

The instrument may be designed to operate with the use of A. C. or D. C. current, and when so constructed, will have a transformer substituted for the battery 21.

The instrument can be used for other purposes than a carpenter's level, such as with various types of machines that require the parts fed thereto to be set up level or plumb with the machine.

The instrument is designed to provide or give a correct signal if the object with which it is used is level or plumb, as the case may be. It can also be used for other signal devices.

While various changes may be made in the detail construction, it shall be understood that such changes shall be within the spirit and scope of the present invention, as defined by the appended claims.

I claim:

1. In a level and plumb instrument, an indicating device therein comprising a supporting plate, side plates of insulating material extending from said supporting plate, a pair of parallel pivot shafts, oscillatably mounted in said side plates, pendulums secured to said shafts, respectively, opposed projection means attached to said pivot shafts, respectively, and extending laterally from the same whereby each said projection means oscillates with said respective pivot shafts, said projection means adapted to slidably contact each other when substantially in a plane containing said pivot shafts, contact means slidably engaging said pivot shafts, respectively, an indicator, a source of energy, and means electrically connecting said pivot shafts, indicator, source of energy and contact means in series, whereby when said support base is level said projection means will contact each other substantially in the plane of said pivot shafts to complete the electrical circuit through said indicator for actuating the same.

2. The combination of claim 1 and means encircling said pendulums, respectively, for limiting the amplitude of the swing of the same.

3. The combination of claim 1 wherein each said projection means is provided with end pointed portions, respectively.

FRANK G. NAGODA.

REFERENCES CITED

The following references are of record in the file of this patent:

UNITED STATES PATENTS

| Number | Name | Date |
|---|---|---|
| 723,526 | Hein | Mar. 24, 1903 |
| 1,058,320 | Mitchell et al. | Apr. 8, 1913 |
| 1,155,824 | Kritle | Oct. 5, 1915 |
| 1,251,349 | Day | Dec. 25, 1917 |
| 1,412,362 | McDougall | Apr. 11, 1922 |
| 1,751,005 | Kimsey | Mar. 18, 1930 |